(12) United States Patent
McEvoy et al.

(10) Patent No.: US 9,261,196 B2
(45) Date of Patent: Feb. 16, 2016

(54) VALVE BODY FILTRATION SYSTEM

(71) Applicant: GE Oil & Gas Pressure Control LP, Houston, TX (US)

(72) Inventors: Travis Kyle McEvoy, Houston, TX (US); Lloyd Ray Cheatham, Houston, TX (US); Ben Calvin Holgate, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 98 days.

(21) Appl. No.: 14/109,480

(22) Filed: Dec. 17, 2013

(65) Prior Publication Data

US 2015/0167851 A1 Jun. 18, 2015

(51) Int. Cl.
*F16K 3/02* (2006.01)

(52) U.S. Cl.
CPC ............. *F16K 3/0227* (2013.01); *F16K 3/0236* (2013.01)

(58) Field of Classification Search
CPC ....... F16K 3/0227; F16K 3/0209; F16K 3/02; F16K 3/0236
USPC ........... 251/326–329, 174, 361, 363; 277/918
See application file for complete search history.

(56) References Cited

U.S. PATENT DOCUMENTS

| | | | | |
|---|---|---|---|---|
| 2,914,086 A * | 11/1959 | Beller | | 251/44 |
| 3,746,303 A * | 7/1973 | Grove et al. | | 251/363 |
| 4,029,294 A * | 6/1977 | McCaskill et al. | | 251/328 |
| 4,055,325 A * | 10/1977 | Vyvial | | 251/328 |
| 4,062,516 A * | 12/1977 | Grove | | 251/328 |
| 4,629,161 A * | 12/1986 | Jones et al. | | 251/328 |
| 4,645,179 A * | 2/1987 | Ali | | 251/328 |
| 7,992,840 B2 | 8/2011 | Cain et al. | | |
| 2012/0080634 A1 | 4/2012 | Fenton | | |
| 2012/0261603 A1* | 10/2012 | Kahn et al. | | 251/328 |
| 2013/0221252 A1 | 8/2013 | Eijkelenberg | | |

FOREIGN PATENT DOCUMENTS

| | | |
|---|---|---|
| CN | 201547286 | 8/2010 |
| EP | 1209391 | 10/2004 |
| WO | 2008063073 A1 | 5/2008 |
| WO | 2014106231 A1 | 7/2014 |

OTHER PUBLICATIONS

International Search Report and Written Opinion issued in connection with corresponding PCT Application No. PCT/US2014/066962 dated Mar. 2, 2015.

* cited by examiner

*Primary Examiner* — John Bastianelli
(74) *Attorney, Agent, or Firm* — Bracewell & Giuliani LLP

(57) ABSTRACT

A gate valve includes a valve body with a How passage intersected by a gate cavity. The gate valve also includes a gate with an axis, a downstream gate face, and an upstream gate face on an opposite side. The gate is axially movable in the gate cavity between a gate closed position and a gate open position. A seat ring is located between each gate face and the valve body, at the intersection of the flow passage and the gate cavity. An annular seal is located between each of the seat rings and the valve body. At least one annular filter is located between at least one of the seat rings and the valve body, each of the at least one filters being located radially inward from one of the seals relative to an axis of the flow passage.

16 Claims, 4 Drawing Sheets

VALVE BODY FILTRATION SYSTEM

BACKGROUND

1. Field of the Invention

The present disclosure relates in general to valves and more particularly, to filters of gate valves for use with oil, gas and other fluids.

2. Description of Prior Art

A gate valve has a body with a flow passage extending through it. A gate cavity intersects the flow passage, and seat rings are located at the upstream and downstream points of intersection. Seat ring seals are located between the seat rings and the valve body. An actuator, which may be mechanical, hydraulic or electrical moves a gate within the cavity between open and closed positions. The gate has an aperture through it. When in the open position, the aperture registers with the flow passage. In the closed position, a seal surface on the gate contacts the downstream seat ring. The upstream pressure exerts a force pushing the seal surface into tight sealing engagement.

When operating the valve, debris often enters the valve and accumulates. The debris can sometimes pass into the space between the seat rings and the valve body and accumulate. Debris can also pass between the seat rings and the gate to enter the gate cavity. The debris causes damage to components in the body and clogs the cavity, preventing proper operation of the valve. This debris can also wear on the seat ring seals damaging these seals and causing them to fail.

SUMMARY OF THE DISCLOSURE

Embodiments of the custom disclosure provide an apparatus and method for reducing the amount of debris that enters the gate cavity and protecting the seat ring seals. A filter can be placed between the seat rings and valve body to trap debris in fluid that enters the space between the seat rings and valve body. A filter can also be located between the seat rings and the gate to further reduce the amount of debris that enters the gate cavity, so that the valve can continue to operate properly, without interference from debris.

In one embodiment of the current disclosure, a gate valve includes a valve body with a flow passage intersected, by a gate cavity. The gate valve also includes a gate with an axis, a dowstream gate face, and an upstream gate face on an opposite side. The gate is axially movable in the gate cavity between a gate closed position and a gate open position. A seat ring is located between each gate face and the valve body, at the intersection, of the flow passage and the gate cavity. An annular seal is located between each of the seat rings and the valve body. At least one annular filter is located between at least one of the seat rings and the valve body, each of the at least one filters being located radially inward front one of the seals relative to an axis of the flow passage.

In an alternative embodiment of the current disclosure, a gate valve includes a valve body with a flow passage for the selective passage of fluids, the valve body being intersected, by a gate cavity. The gate valve also includes a gate with an axis, a downstream gate face, and an upstream gate face on an opposite side. The gate is axially movable in the gate cavity between a gate closed position and a gate open position. An upstream seat ring is located between the upstream gate face and the valve body, at the intersection of the flow passage and the gate cavity. An annular seal is located between the upstream seal ring and the valve body. An annular filler is located between the upstream seat ring and the valve body, the filter being located, radially inward from the seal relative to an axis of the flow passage.

In yet another alternative embodiment of the current disclosure, a method of opening and closing a flow line includes providing a gate valve with a valve body with a flow passage intersected by a gate cavity. A gate is moved within the gate cavity between a gate closed position and a gate open position. The gate has a downstream gate face and an upstream gate face on an opposite side. A seat ring is provided between each gate face and the valve body, at the intersection of the flow passage and the gate cavity. An annular seal is provided between each of the seat rings and the valve body. A fluid flow along a flow path between at least one of the seat rings and the valve body is filtered with a filter located radially inward from one of the annular seals relative to an axis of the flow passage.

BRIEF DESCRIPTION OF DRAWINGS

Some of the features and benefits of the present disclosure having been stated, others will become apparent as the description proceeds when taken in conjunction with the accompanying drawings, in which.

Figure 1:
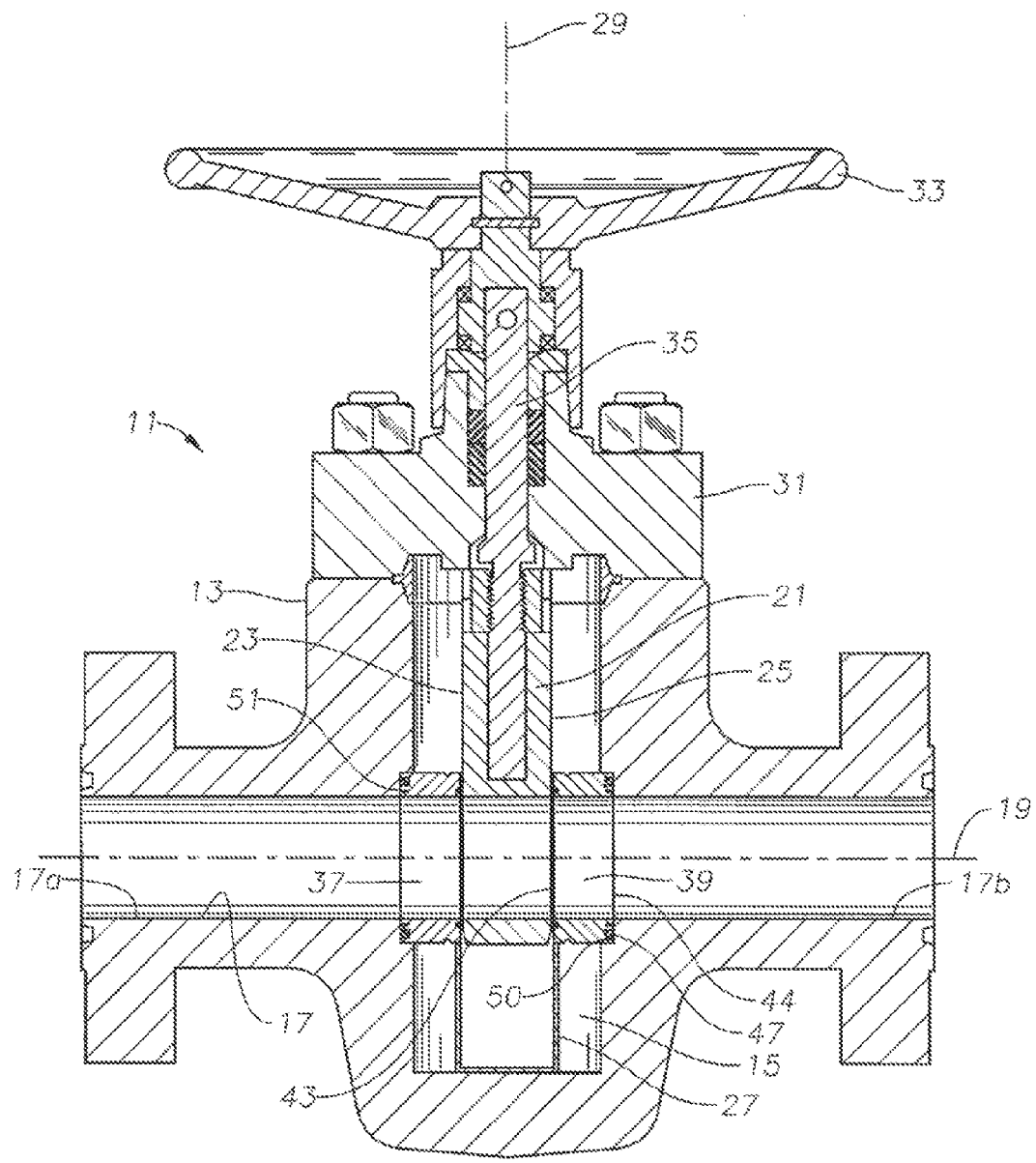
FIG. 1 is a sectional view of a gate valve in a gate open position constructed in accordance with an embodiment of this disclosure.

While the disclosure will be described in connection with the preferred embodiments. It will be understood that it is not intended to limit the disclosure to that embodiment on the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will he thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, valve 11 has a valve body 13 with agate cavity 15 located therein. Valve 11 can be, for example associated with a wellhead assembly that is disposed over a well.

The wellhead assembly can include a wellhead housing, a production tree over the housing and flow lines connected to the tree or the wellhead assembly. The flow lines and wellhead assembly can include embodiments of valve 11 described herein. Valve 11 can also be used for regulating fluids, such as a fracturing fluid, that are designated for entry into the wellhead assembly. The wellhead assembly can be at surface or can be subsea.

A flow passage 17 is defined by flow line passages 17a, 17b, which extend through body 13, are coaxial with each other about an axis 19 and intersect gate cavity 15. A gate 21 is carried within cavity 15 for movement in a plane perpendicular to axis 19 of flow line passages 17, 17b. Gate 21 is generally rectangular, having upstream and downstream gate faces 23, 25. A skirt 27 located within cavity 15 will help maintain the correct orientation of gate 21. Depending on the direction of fluid flow, either gate face 23, 25 will be the upstream side. For purposes of this disclosure, gate face 23 will be described, as the upstream side, however if the fluid flow was reversed, gate face 25 would be the upstream side. Although embodiments of this disclosure are described with fluid flow in one direction, it can be understood that embodiments of this disclosure can function equally with fluid flow in either direction.

Gate 21 can be moved axially within gate cavity 15 between a gate closed position and a gate open position. Gate 21 can be moved by a rising stem, wherein the rising stem moves linearly outward from body 13 along gate axis 29 as gate 21 is being lifted. Alternately, as shown in FIG. 1, gate 21 can have a threaded nut on its upper end and be moved by a rotating non-rising stem. A bonnet 31 is mounted to the upper end of body 13. A hand wheel 33 is employed to cause the stem 35 to rotate. Alternately, a hydraulic, pneumatic, or electric actuator could be utilized to cause axial movement of the stem 35. A stem seal located in bonnet 31 seals around the stem 35 and seals pressure and fluids within gate cavity 15.

A metal seat ring 37, 39 is located between each gate face 23, 25, respectively, and valve body 13, at the intersection of each flow passage 17a, 17b, respectively, with gate cavity 15. Seat rings 37, 39 have holes 41 (FIG. 2) therethrough that register with the flow passages 17a, 17b). Each seat ring 37, 39 has an inward directed inner end 43 for engaging and sealing against the gate faces 23, 25. The distance between the inner ends 43 of seat rings 37, 39 is slightly greater than the thickness of gate 21. Seat rings 37, 39 can be biased by springs toward each other. Each seat ring 37, 39 has an outer end 44 opposite the inner end 43. Outer end 44 engages valve body 13.

Gate 21 can be a single slab type or a split slab type. Gate 21 has a flow passage or opening 45 (FIG. 2) that registers with flow passages 17a, 17b and holes 41 in seat rings 37, 39 when the gate is in a gate open position. The inner diameter of gate opening 45 is typically the same as holes 41 in seat rings 37, 39 and flow passages 17a, 17b. In the gate closed position, the gate opening 45 is not aligned with the flow passages 17a, 17b and the gate 21 instead blocks the flow passages 17a, 17b. When the gate 21 is in the gate closed position, the fluid forces on upstream gate face 23 will cause the downstream gate face 25 of gate 21 to seal against the seal surface of downstream seat ring 39. Because the distance between the seal surfaces of seat rings 37, 39 is slightly greater than the thickness of gate 21, upstream gate face 23 will not seal against the seal surface of seal ring 37 and fluids can escape through the gap between upstream gate face 23 and seat ring 37 and flow into cavity 15. The stem seal (not shown) will prevent fluids from escaping from the gate cavity 15. In alternative embodiments, upstream gate face 23 can seal against the seal surface of seat ring 37 or there can be sealing between both seat rings 37, 39 and the gate faces 23, 25, respectively.

Figure 2:
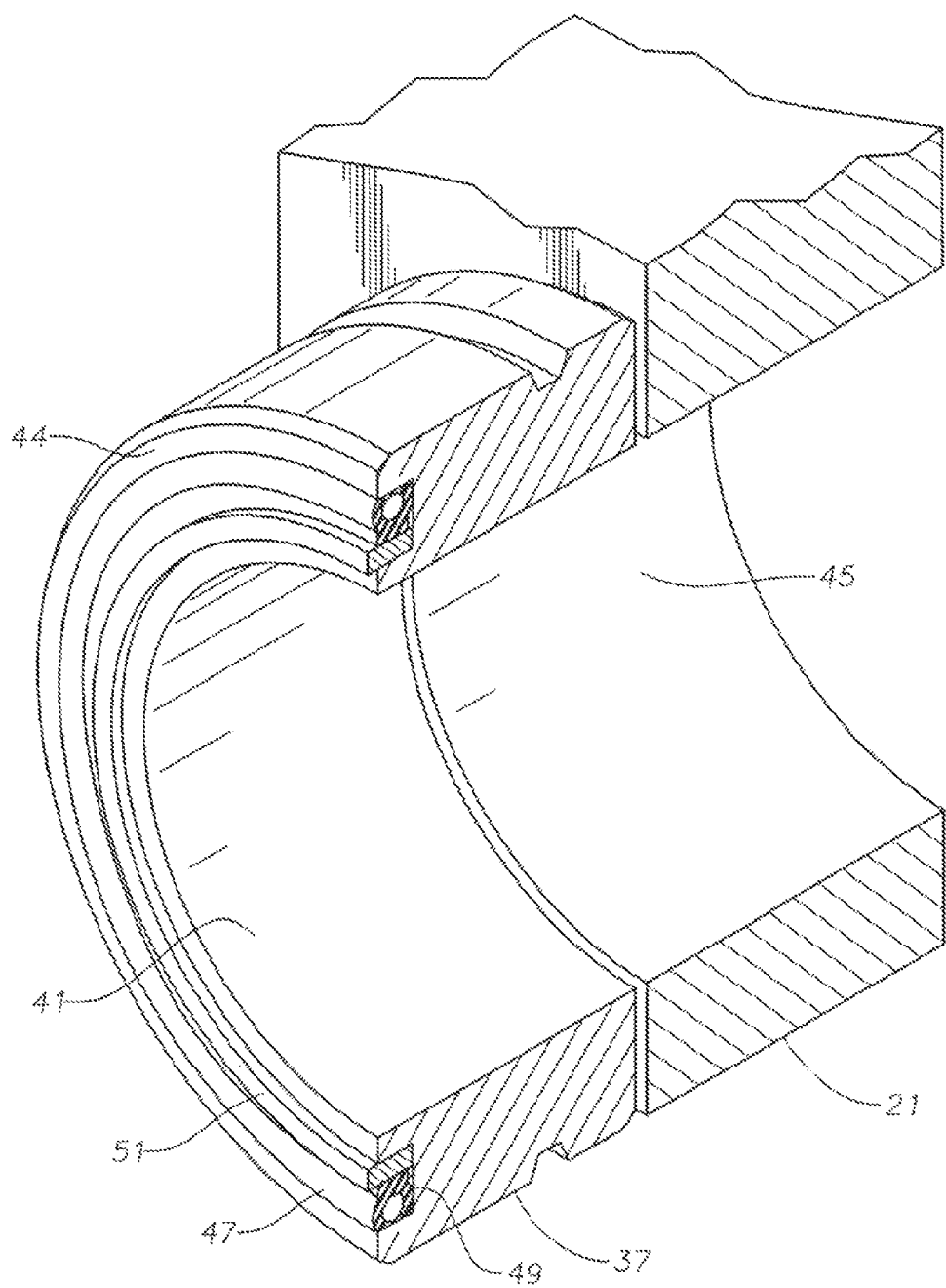
FIG. 2 is a perspective sectional view of portion of the gate and seat rings of the gate valve of FIG. 1 with a filter of this disclosure.
Figure 3A:
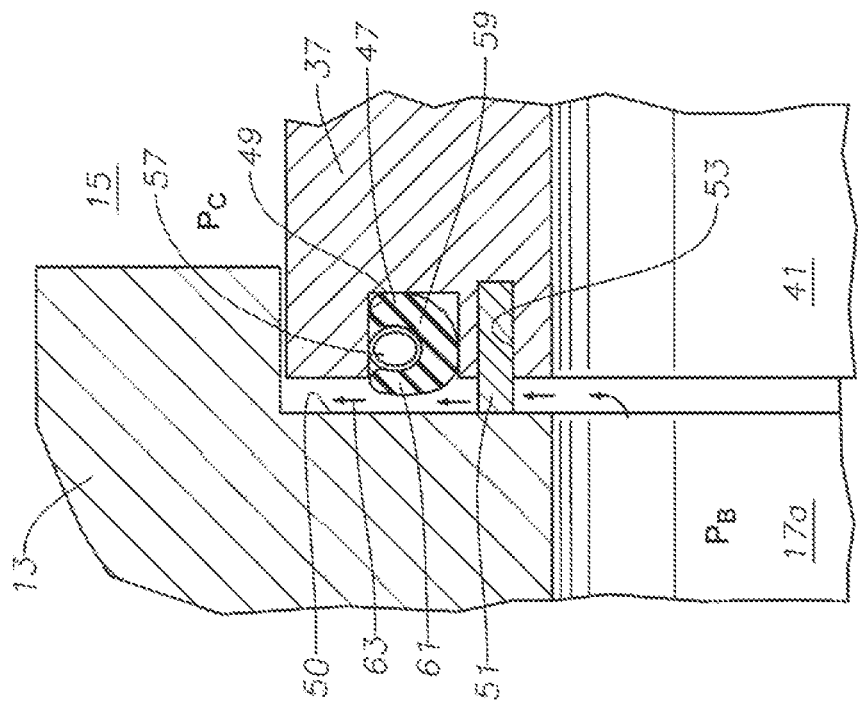
FIG. 3A is a sectional view of a seal and filter of the gate valve of FIG. 1, with the seal blocking fluid flow.
Figure 3B:
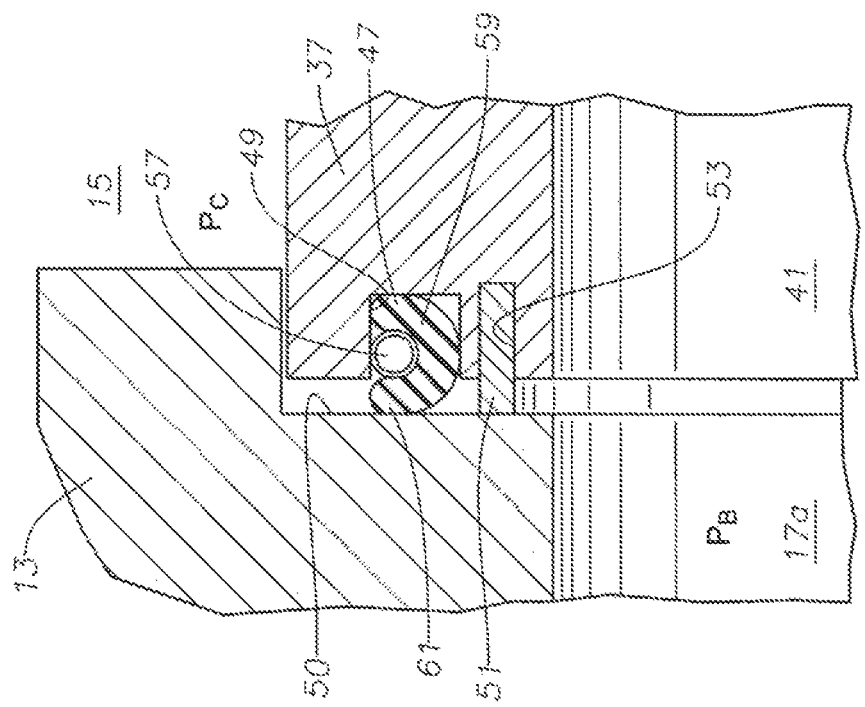
FIG. 3B is a sectional view of a seal and filter of the gate valve of FIG. 1, with a fluid flow passing by the seal.

Looking at FIGS. 1-3B, gate seat seal 47 is a ring shaped seal that surrounds holes 41 in scat rings 37, 39. Gate seat seals 47 are located between each seat ring 37, 39 and the valve body 13 to create a pressure and Enid seal between seat rings 37, 39 and a counterbore shoulder 50 of the valve body 13. Gate seat seal 47 is located within a first circumferential groove 49 that is located on outer end 44. In the embodiments of FIGS. 3A-3B, seat seal 47 is a one-way seal. Seat seal 47 has a tubular inner seal member 57 that is located with the arms of a "U" shaped outer seal member 59. The arms of the outer seal member 59 point away from hole 41 in the seat rings 37, 39.

As shown in FIG. 3A, when the gate cavity pressure Pc in the gate cavity 15 is sufficiently high, or there is a sufficient pressure differential between the cavity pressure Pc and flow passage pressure Pb in the flow passage 17, with gate cavity pressure Pc being higher than flow passage pressure Pb, the seat seal 47 is energized. Outer leg 61 of the outer seal member 59 will be pushed against counterbore shoulder 50, creating a fluid seal between the valve body 13 and the seat ring 37, 39. However, as shown in FIG. 3B, when there is a sufficient pressure differential between gate cavity pressure Pc, and flow passage pressure Pb, with flow passage pressure Pb being higher, then outer leg 61 will be pushed inward and a fluid flow 63 can escape past the seat seal 47 from flow passage 17 towards gate cavity 15. As fluid flow 63 passes through filter 51, debris within fluid flow 63 will be trapped and such debris will not reach seat seal 47 or gate cavity 15.

Although this event is shown with the gate 21 in the gate open position, fluid flow 63 can also escape past the seat seal 47 when the gate 21 is in the gate closed position, or when gate 21 is in between the gate open and the gate closed position. In alternative embodiments, seat seal 47 can be an alternative type of seal, as are known in the art, and fluid flow 63 can pass by seat seal 47 at various times during the operation of the valve 11.

In the embodiment of FIG. 1, there is a ring shaped filter 51 between each seat ring 37, 39 and valve body 13. In other embodiments, there is only one filter 51 and it is located on the seat ring 37 that is hefweeu the upstream gate face 23 and valve body 13.

Filter 51 circumscribes hole 41 in seat rings 37, 39. In the embodiments of FIGS. 1-2, filter 51 is located radially inward from the gate seat seal 47 relative to axis 19. Filter 51 can be located within the first circumferential groove 49 (FIG. 2) or within a second circumferential groove 53 (FIGS. 3A-3B). Second circumferential groove 53 is located radially inward from first circumferential groove 49. In alternative embodiments, filter 51 could be located within a groove on counterbore shoulder 50.

Figure 4:
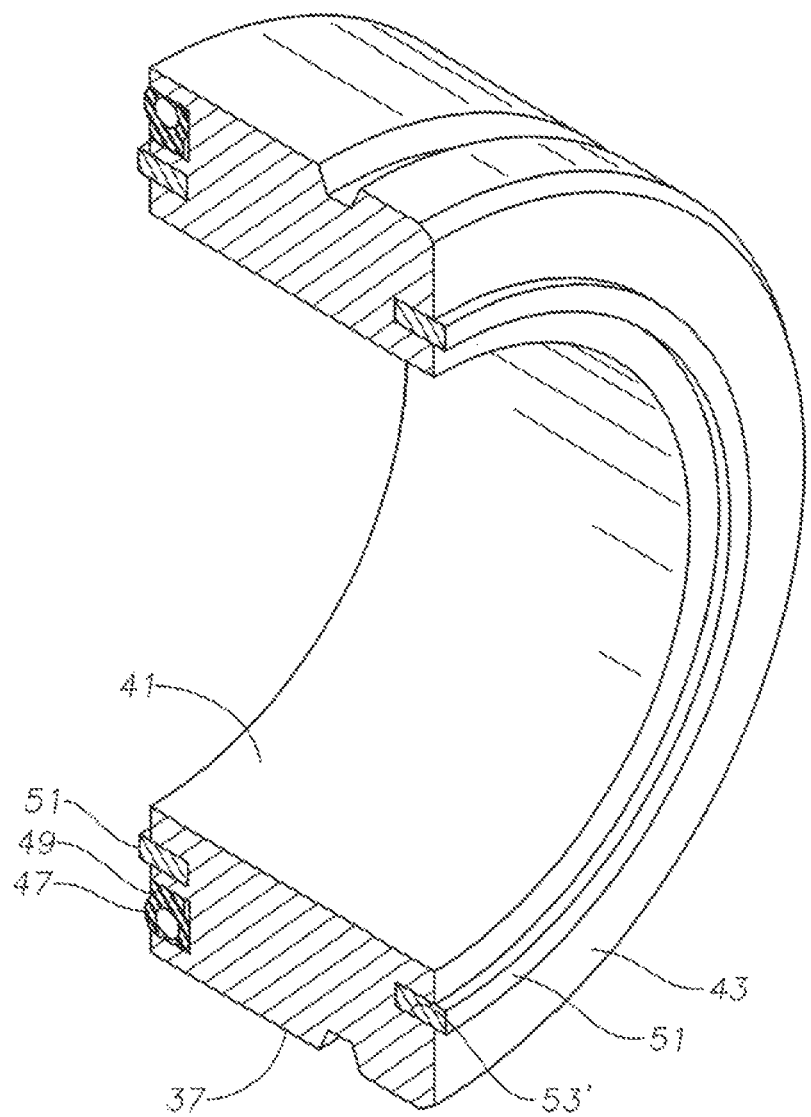
FIG. 4 is a perspective sectional view of a portion of an alternative embodiment of the seat ring of the gate valve of FIG. 1 with a filter of this disclosure.

In the embodiment of FIG. 4 a filter 51 is located between the seat rings 37, 39 and gate 21. In such an embodiment, filter 51 is instead located within a gate side circumferential groove 53' on inner end 43. In such an embodiment, filter 51 prevents debris from entering gate cavity 15 through a gap between the inner end 43 of seat rings 37, 39 and gate 21.

Filter 51 is formed of a material that will allow for pressure and fluid to be conveyed across filter 51, but will trap debris that is in the fluids that passes into valve 11. Filter 51 will reduce the amount of debris and fluid that penetrates the space between the valve body 13 and seat rings 37, 39 or the gate 21 and seat rings 37, 39, as applicable. Filter 51 can be formed, for example of wire mesh. The wire size and density, number of layers of wires, and the compression of the wire mesh will be determined based on the operating conditions of valve 11.

In alternative embodiments, the filter can be formed of other suitable material that allows for the communication of pressure and trapping of debris.

The gate valve described herein has significant advantages. By reducing the amount of debris that reaches the gate seat seal 47, the useful life of gate seat seal 47 will be increased and the failure rate of gate seat seal 47 will be decreased. Filter 51 will also decrease the amount of debris that passes into gate cavity 15, reducing damage to the valve components. Reducing the amount of debris entering gate cavity 15 will also help to maintain the proper operation of valve 11 since there will be less debris within gate cavity 15 to impede movement of the gate 21. This will decrease the costs and time associated with maintenance of valve 11 and replacement of the components of valve 11.

The terms "vertical", "horizontal", "upward", "downward", "above", and "below" are used herein only for convenience because valve 11 may be installed in various positions, other than with the stem 35 pointing upward.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A method of opening and closing a flow line, comprising:
   (a) providing a gate valve with a valve body with a flow passage intersected by a gate cavity;
   (b) moving a gate within the gate cavity between a gate closed position and a gate open position, the gate having a downstream gate face, and an upstream gate face on an opposite side;
   (c) providing a seat ring between each gate face and the valve body, at the intersection of the flow passage and the gate cavity;
   (d) providing an annular seal between each of the seat rings and the valve body, wherein each of the seals comprises a one way seal, the method further comprising allowing the fluid flow to pass by one of the seals from the flow passage towards the gate cavity; and
   (e) filtering a fluid flow along a flow path between at least one of the seat rings and the valve body with a filter located radially inward from one of the annular seals relative to an axis of the flow passage.

2. The method of claim 1, wherein each of the seat rings has and an outer end that engages the valve body and step (e) comprises filtering the fluid flow along a path between the valve body and the outer end of the seat ring that is located between the upstream gate face and the valve body.

3. The method of claim 1, wherein each of the seat rings has an outer end that engages the valve body and step (e) comprises filtering the fluid flow along a path between the valve body and the outer end of each of the seat rings.

4. The method of claim 1, further comprising filtering the fluid flow along a flow path between at least one of the seat rings and the gate.

5. A gate valve, comprising:
   a valve body with a flow passage intersected by a gate cavity;
   a gate with an axis, a downstream gate face, and an upstream gate face on an opposite side, the gate being axially movable in the gate cavity between a gate closed position and a gate open position;
   a seat ring located between each gate face and the valve body, at the intersection of the flow passage and the gate cavity;
   an annular seal located between each of the seat rings and the valve body, wherein each of the seals comprises a one way seal for selectively allowing a fluid flow to pass from the flow passage to the gate cavity between one of the seat rings and the valve body; and
   at least one annular filter located between at least one of the seat rings and the valve body, each of the at least one filters being located radially inward from one of the seals, relative to an axis of the flow passage.

6. The gate valve of claim 5, wherein: each of the seat rings has an outer end that engages the valve body; and one of the seals and one of the at least one filters are located on the outer end.

7. The gate valve of claim 5, wherein the at least one filter comprises a plurality of filters, each of the at least one filters being located on one of the seat rings.

8. The gate valve of claim 5, wherein each of the seat rings has an inner end that engages the gate and an outer end that engages the valve body, wherein one of the at least one filters is located in and protruding from a groove in one of the inner ends and another one of the at least one filters is located in and protruding from a groove in one of the outer ends.

9. The gate valve of claim 5, wherein each of the seat rings has a hole extending through the seat ring that registers with the flow passage of the valve body and wherein one of the at least one filters circumscribes the hole of at least one of the seat rings.

10. The gate valve of claim 5, wherein:
    each of the seat rings has an outer end that engages the valve body;
    one of the seat rings further comprises a first circumferential groove located on the outer end; and
    one of the seals and one of the at least one filters are located in the first circumferential groove.

11. The gate valve of claim 5, wherein:
    each of the seat rings has an outer end that engages the valve body;
    one of the seat rings further comprises a first circumferential groove located on the outer end, and a second circumferential groove located on the outer end radially inward from the first circumferential groove relative to an axis of the flow passage;
    one of the seals is located in the first circumferential groove; and
    one of the at least one filters is located in the second circumferential groove.

12. The gate valve of claim 5, wherein each of the at least one filters comprise wire mesh.

13. A gate valve, comprising:
    a valve body with a flow passage for the selective passage of fluids, the valve body being intersected by a gate cavity;
    a gate with an axis, a downstream gate face, and an upstream gate face on an opposite side, the gate being axially movable in the gate cavity between a gate closed position and a gate open position;
    an upstream seat ring located between the upstream gate face and the valve body, at the intersection of the flow passage and the gate cavity;
    an annular seal located between the upstream seat ring and the valve body, wherein the seal comprises a one way seal for selectively allowing a fluid flow to pass from the flow passage to the gate cavity after the fluid flow has passed through the filter; and an annular filter located between the upstream seat ring and the valve body, the filter being located radially inward from the seal relative to an axis of the flow passage.

14. The gate valve of claim 13, wherein:

the upstream seat ring has an outer end for engaging the valve body;

the valve body comprises a counterbore with an inward facing shoulder; and the filter extends from the outer end of the upstream seat ring into engagement with the inward facing shoulder.

15. The gate valve of claim 13, wherein:

the upstream seat ring has an outer end for engaging the valve body;

the upstream seat ring further comprises a first circumferential groove located on the outer end; and the seal and the filter are located in the first circumferential groove.

16. The gate valve of claim 13, wherein:

the upstream seat ring has an outer end for engaging the valve body;

the upstream seat ring further comprises a first circumferential groove located on the outer end and a second circumferential groove located on the outer end radially inward from the first circumferential groove relative to an axis of the flow passage; and the seal is located in the first circumferential groove and the filter is located in the second circumferential groove.

\* \* \* \* \*